July 14, 1959  J. J. KILLORAN ET AL  2,894,918
PARTICULATE FOAMABLE POLYMER COATED WITH
FLAME RETARDANT MATERIAL AND
METHOD OF MAKING SAME
Filed Feb. 17, 1954
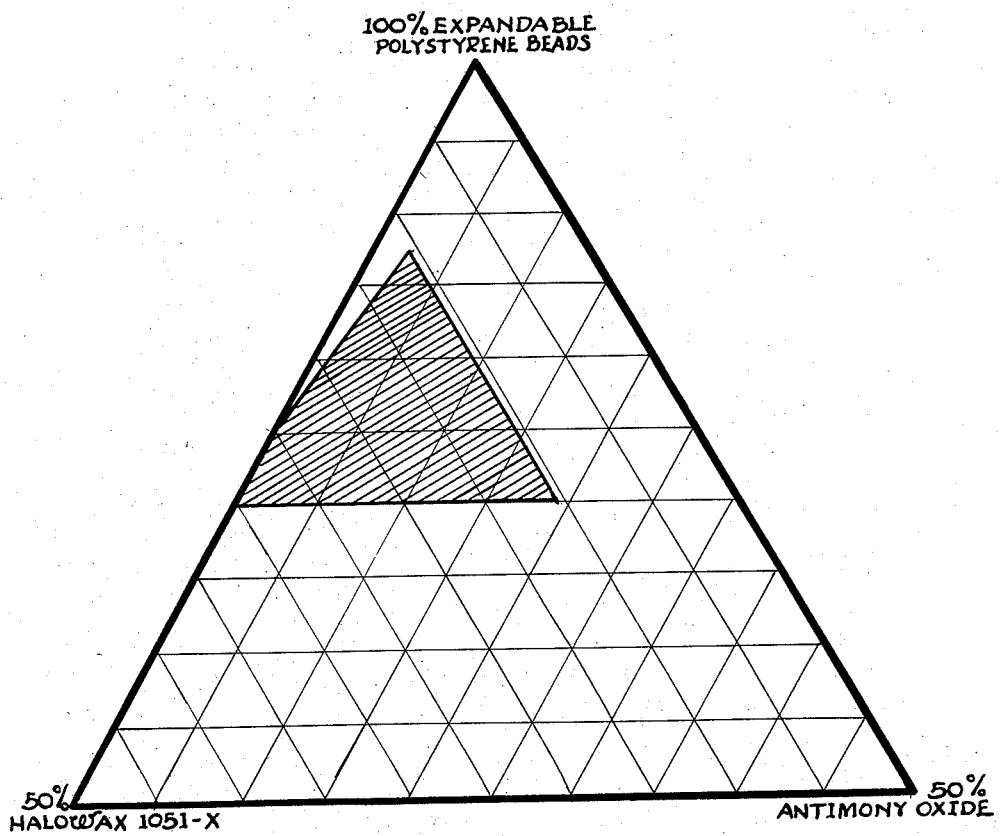
INVENTORS.
GAETANO F. D'ALELIO &
JOHN J. KILLORAN
BY
their ATTORNEY.

United States Patent Office 2,894,918
Patented July 14, 1959

2,894,918

PARTICULATE FOAMABLE POLYMER COATED WITH FLAME RETARDANT MATERIAL AND METHOD OF MAKING SAME

John J. Killoran and Gaetano F. d'Alelio, Pittsburgh, Pa., assignors to Koppers Company, Inc., a corporation of Delaware Application February 17, 1954, Serial No. 410,761

9 Claims. (Cl. 260—2.5)

This application is concerned with polymeric compositions and methods for their preparation. Generally, it is concerned with storable compositions of polymeric particles capable of being expanded to produce cellular, flame-retardant structures. More particularly, it is concerned with such storable compositions of polymeric materials derived from vinyl aromatics, particularly styrene. Further, the application is concerned with a method of preparing said storable compositions by dry mixing of their constituents and with the expansion of said compositions to produce cellular flame-retardant polymeric structures. In an important aspect the invention is concerned with discrete expandable polymer particles coated with a mixture of a highly halogenated hydrocarbon and antimony oxide.

It is known in the prior art to use highly halogenated hydrocarbons in admixture with polymeric materials to yield flame-retardant compositions. Similarly, the use of antimony oxide to impart flame-retardancy is known. However, prior uses in cellular polymeric structures have required that the flame-retardants be incorporated homogeneously within the polymer before expansion. The present invention, however, provides a means of producing flame-retardant cellular polymeric structures without incorporating the flame retardants within the polymer prior to foaming. That is, according to the present invention, the incorporation of the flame retardants within the polymer structure takes place concomitantly with the expansion step. It is surprising that this gives sufficient distribution of a flame retardant or retardants within the cellular structure that it operates effectively to impart flame-retardancy to the structure. The invention thus eliminates the necessity of distributing the flame retardant within the polymer prior to expansion thus eliminating a burdensome and costly operation. Further, the present invention provides a composition capable of being expanded in situ, and which in the expanded state has flame-retardant properties. This is in contrast to prior flame-retardant cellular polymeric structures which polymers were derived from ethylenically unsaturated monomers which were foamed at the place of manufacture and not adapted to foaming or expansion in situ.

A further advantage of the present invention lies in its particular utility in connection with the method of suspension polymerization. In place of the known methods which incorporate the fire-retardants within the polymer prior to foaming, the present invention provides a means of incorporating the fire-retardants as the polymer is foamed. This is of particular advantage with the products of suspension polymerization, such as, for example, polystyrene, in light of the fact that these products are "beads" or granules.

Figure 1 is a triangular plot of one embodiment of this invention illustrating compositions containing expandable polystyrene beads containing 10 parts petroleum ether boiling in the range 35–60° C. per 90 parts polystyrene, Halowax 1051X, a chlorinated naphthalene, and antimony oxide. The shaded area embraces compositions which are self-extinguishing.

In one aspect the present invention embraces compositions capable of being expanded to produce a flame-retardant cellular polymer structure comprising (A) particles of a polymer, derived from an ethylenically unsaturated monomer, having integrated therewith from 5 to 30 parts of an aliphatic hydrocarbon per 100 parts polymer said hydrocarbon having a boiling point below the incipient softening point of said polymer; (B) a highly halogenated non-volatile hydrocarbon and, (C) antimony oxide; said constituents A, B, and C being present in proportions embraced by the shaded area of Figure 1. It will be realized that antimony oxide can be omitted in the foregoing composition and that there will be obtained a composition of decreased flame-retardant properties.

In another aspect, the invention embraces storable polymeric particles derived from ethylenically unsaturated monomers and capable of being expanded to produce a cellular polymeric structure coated with a highly halogenated non-volatile hydrocarbon containing antimony oxide admixed therewith, said polymer, halogenated hydrocarbon and antimony oxide being present in proportions embraced by the shaded area of Figure 1, particularly polystyrene particles, specifically polystyrene granules or beads derived from suspension polymerization. Further, the invention is concerned, in a method of preparing storable compositions capable of being expanded to produce flame-retardant cellular polymeric structures, with the steps of melting a highly halogenated non-volatile hydrocarbon, homogeneously admixing therewith antimony oxide, cooling said mixture, comminuting said mixture, and coating said comminuted mixture on to expandable polymeric particles, derived from an ethylenically unsaturated monomer, having integrated therewith from 5 to 30 parts of an aliphatic hydrocarbon per 100 parts polymer, said aliphatic hydrocarbon having a boiling point below the incipient softening point of said polymer, said substances being utilized in quantities embraced within the shaded area of Figure 1.

It has been discovered as a feature of this invention that it is possible to prepare such compositions as aforementioned by utilizing expandable polymeric particles containing an aliphatic hydrocarbon expansion agent as described in a copending application of Gaetano F. D'Alelio, Serial No. 394,230, filed November 24, 1953. The expandable polymeric particles described in that application include both homopolymers and copolymers. The homopolymers are derived from vinyl hydrocarbon monomers such as ethylene, styrene, nuclear dimethylstyrenes, isobutylene, vinyl naphthalene, and the like. The expandable copolymers contemplated are copolymers of styrene and butadiene; styrene and α methylstyrene; styrene, butadiene and α methylstyrene; styrene and isobutylene; styrene and dimethylstyrene; and isobutylene and butadiene. In one aspect of this invention, these particles are coated with a previously prepared mixture of a highly halogenated non-volatile hydrocarbon and antimony oxide. These coated particles are capable of expansion and coalescence to produce an integral cellular polymeric structure which is flame retardant and at the same time possesses mechanical properties, substantially similar to those of structures obtained by expanding uncoated polymeric particles under the same conditions.

In another aspect, the invention is concerned with homogeneous admixtures of said expandable particles and an admixture of a highly halogenated non-volatile hydrocarbon with antimony oxide. This composition is capable of being expanded to produce an integral cellular polymeric structure which is flame retardant. Here again the mechanical properties of the flame-retardant structure are substantially equal to those obtained by expanding uncoated expandable polymeric particles under the same conditions.

As used herein the term "flame retardant" means that the rate of burning of the specimen is considerably slower than the rate of burning of an untreated material. In most instances the treated material will eventually cease to burn, that is, it is self-extinguishing.

The term "storable" is used herein to indicate that the materials can be kept for a period of time without losing their quality of being expandable and coalescing upon expansion. Of course, it is preferable to store the materials in a closed container to minimize diffusion and evaporation of the aliphatic hydrocarbon expanding agent.

It is to be noted that the compositions herein are expandable in situ as are the expandable polymeric particles disclosed in the aforementioned D'Alelio application. That is, they may be expanded as desired upon the application of heat, such as, for example, steam or hot air as described in the aforementioned application.

The compositions of this invention can be expanded to produce discrete cellular polymeric particles having flame-retardant properties. Further, the compositions can be utilized to produce integral cellular polymeric structures with flame-retardant properties. Additionally, the compositions can be used to produce "sandwich" type constructions of cellular polymeric structures, as for example, with plywood, sheet metal, metal foil, paper and the like.

The highly halogenated non-volatile hydrocarbons used in the present invention are in general substances that contain in excess of 65% by weight halogen and which boil above 200° C. at atmospheric pressure. The chlorinated hydrocarbon compounds are preferred. Illustrative of the types of materials that are useful herein are Chlorowax 70, which is a cream-colored, powdered, non-toxic resinous chlorinated paraffin of a specific gravity in the range 1.6–1.7 and having a melting point in the range 90–100° C., and Halowax 1051X which is a chlorinated naphthalene containing approximately 70% by weight of chlorine.

As used herein the term "highly halogenated" indicates that the halogenated hydrocarbon contains at least 50% by weight of halogen.

Finely-powdered antimony oxide, such as is obtained commercially, is useful herein.

In preparing the mixture of the antimony oxide and highly halogenated hydrocarbon which is then admixed with the expandable polymeric particles, it is preferred to melt the halogenated hydrocarbon and admix it with the antimony oxide in the form of a paste. Upon cooling, this material is comminuted to a small particle size preferably to such a size that the particles pass through a 100-mesh screen. Alternately, the halogenated hydrocarbon and antimony oxide can be reduced to small particle size separately and then admixed, for example, by tumbling in a ballmill to produce a homogeneous mixture.

The expandable polymeric particles can be admixed with, or coated by, the halogenated hydrocarbon-antimony oxide mixture by mechanically providing intimate rubbing contact between the expandable polymeric particles and the halogenated hydrocarbon-antimony oxide particles. This can be accomplished, for example, in a ball mill type apparatus having a minimum number of balls therein or other known device for providing such contact between particles.

This invention contemplates the use of an adhesive coating in the polymeric particles which are to be coated with a flame-retardant composition. Adhesives which are non-solvents for the polymer particles are useful such as, for example, polyvinyl acetate adhesives, styrene-butadiene latices, plasticized polystyrene, polymethylmethacrylate, and glyceryl phthalate type adhesives. Use of such adhesives retards or avoids the separation of the flame-retardant coating from the polymeric particles during shipment or handling.

An advantage of the method of the present invention resides in the fact that the various ingredients can be admixed essentially in the dry state and without the necessity of utilizing solvents or liquid carriers which must be removed from the system.

The proportions of the various ingredients are illustrated in Figure 1. In general, the relative quantities of polymeric particles, non-volatile, highly halogenated hydrocarbon and antimony oxide which are useful lie within the shaded area of Figure 1 which as beforedescribed is concerned with polystyrene, Halowax 1051X, and antimony oxide.

The invention is illustrated by but not restricted to the following preferred embodiments.

10 parts powdered Chlorowax 70 and 7.5 parts antimony oxide powder are mixed together and heated to a temperature in the range 95–100° C. The mixture melts to form a paste which is admixed to achieve homogeneity, is cooled, and ground to a fine powder which is screened to at least 100 mesh. The finely-divided powder is dry mixed with 82.5 parts expandable polystyrene beads which contain 6 parts petroleum ether boiling in the range 35–60° C. per 90 parts polystyrene by tumbling in a shell mixer. There is obtained a storable composition capable of being expanded to produce a flame-retardant cellular polymeric structure.

A mold having vent means therein is filled approximately 8% full of the mixture, the mold closed and steam introduced therein. After 10 minutes the addition of steam is discontinued, the mold opened and the product removed. There is obtained a cellular polymer having small voids and a density of approximately two pounds per cubic foot which is self-extinguishing, that is, upon being ignited upon application of flame, after removal of the flame, the burning ceases of its own accord.

Upon tumbling of the foregoing mixture of expandable polystyrene beads and particles of the mixture of Chlorowax 70 and antimony oxide in a ball mill equipped with only 2 or 3 balls, there are obtained discrete expandable polystyrene beads coated with the Chlorowax 70-antimony oxide mixture. These coated beads contain the expandable polystyrene, Chlorowax 70 and antimony oxide in substantially the ratio in parts by weight of 82.5/10/7.5.

Upon expansion in a mold, as above described, there is obtained a flame-retardant cellular polystyrene having small voids and of a density of approximately 3 pounds per cubic foot, which is self-extinguishing.

Substitution of an equal weight of Halowax 1051X, a chlorinated naphthalene containing approximately 65% chlorine, in the foregoing procedure for the Chlorowax 70 there used yields substantially similar results.

Similarly, the various expandable polymeric particles disclosed in the aforementioned D'Alelio application can be substituted in the foregoing procedure for the polystyrene there used to yield flame-retardant cellular polymeric structures having small voids and of the approximate densities obtained above, which structures are self-extinguishing.

While the invention has been described with reference to particular embodiments thereof, it will be understood that in its broader aspects the invention is not limited thereto, but the invention may be variously embodied within the scope of the invention as set forth herein and in the appended claims.

What is claimed is:

1. A storable composition capable of being expanded and concomitantly coalesced to produce a flame-retardant integral polymeric structure characterized by small voids and a density of approximately 2–3 lbs. per cubic foot consisting essentially of at least 70 parts by weight of polymer beads, said polymer beads being a polymer of a hydrocarbon monomer selected from the group consisting of ethylene, styrene, nuclear dimethylstyrene, isobutylene and vinyl naphthalene, having integrated therewith from 5 to 30 parts of aliphatic hydrocarbon boiling in the range of 30 to 100° C. per 100 parts polymer, containing a surface coating of from 10 to 30 parts by weight of a chlorinated non-volatile hydrocarbon containing at least 65% chlorine selected from the group consisting of chlorinated paraffins and chlorinated naphthalene; and a minor portion of antimony oxide ranging from 2.5 to 20 parts by weight.

2. Storable polymer beads, said polymer beads being a polymer of a hydrocarbon monomer selected from the group consisting of ethylene, styrene, nuclear dimethylstyrene, isobutylene and vinyl naphthalene, having integrated therewith from 5 to 30 parts of aliphatic hydrocarbon boiling in the range of 30 to 100° C. per 100 parts polymer, said beads being capable of being expanded and concomitantly coalesced to produce an integral cellular polymeric structure characterized by small voids and a density of approximately 2–3 lbs. per cubic foot, the surface of which is intimately covered with a chlorinated non-volatile hydrocarbon containing at least approximately 65% chlorine selected from the group consisting of chlorinated paraffins and chlorinated naphthalene having antimony oxide homogeneously admixed therewith; said polymer, chlorinated hydrocarbon and antimony oxide being present in proportions of approximately 70 to 87.5, 10 to 30 and 2.5 to 20 respectively.

3. A composition of claim 2 in which the polymer is polystyrene and the chlorinated hydrocarbon is chlorinated naphthalene.

4. A storable composition capable of being expanded and concomitantly coalesced to produce flame-retardant integral cellular polystyrene characterized by small voids and a density of approximately 2–3 lbs. per cubic foot consisting of 82.5 parts of polystyrene beads having integrated therein 5 to 6 parts of petroleum ether boiling in the range of 35 to 60° C. per 90 parts polystyrene beads, containing a surface coating of 10 parts of a chlorinated paraffin containing at least about 65% chlorine; and 7.5 parts comminuted antimony oxide.

5. A storable composition capable of being expanded and concomitantly coalesced to produce a flame-retardant integral polymeric structure characterized by small voids in a density of approximately 2–3 lbs. per cubic foot prepared by the steps of melting approximately 10 to 30 parts by weight of a non-toxic resinous chlorinated paraffin containing at least about 65% chlorine, homogeneously dry mixing therewith from 2.5 to 20 parts by weight of finely divided antimony oxide, thoroughly covering by dry mixing the surface of polystyrene beads having integrated therewith from 5 to 30 parts of petroleum ether boiling in the range of 35 to 60° C. per 100 parts of polymer, said polystyrene being utilized in a quantity of 70 to 87.5 parts by weight, with the homogeneous mixture of said chlorinated paraffin and said antimony oxide.

6. In a method of preparing storable compositions capable of being expanded and concomitantly coalesced to produce flame-retardant integral cellular polymeric structures characterized by small voids and a density of about 2–3 lbs. per cubic foot, the steps of melting a non-volatile chlorinated hydrocarbon containing at least about 65% chlorine selected from the group consisting of chlorinated paraffins and chlorinated naphthalene, homogeneously dry mixing therewith at a temperature of 95 to 100° C. antimony oxide, cooling the mixture, comminuting said mixture, intimately covering by dry mixing with said comminuted mixture expandable polymeric beads, said polymeric beads being a polymer of a hydrocarbon monomer selected from the group consisting of ethylene, styrene, nuclear dimethylstyrene, isobutylene and vinyl naphthalene, having integrated therewith from 5 to 30 parts of an aliphatic hydrocarbon boiling in the range of 30 to 100° C. per 100 parts polymer, said chlorinated hydrocarbon, antimony oxide, and polymeric beads being utilized in proportions of approximately 10 to 30, 2.5 to 20 and 70 to 87.5 parts by weight respectively.

7. The process of claim 6 in which the expandable polymer beads are polystyrene beads containing 10 parts petroleum ether boiling in the range of 35 to 60° C. per 90 parts polystyrene and the chlorinated hydrocarbon is chlorinated naphthalene containing at least about 65% chlorine.

8. In a method for preparing storable compositions capable of being expanded and concomitantly coalesced to produce flame-retardant integral cellular polymeric structures characterized by small voids and a density of about 2–3 lbs. per cubic foot, the steps of thoroughly covering by dry mixing the surface of expandable polystyrene beads having integrated therewith from 5 to 30 parts of a petroleum ether boiling in the range of 35 to 60° C. per 100 parts polystyrene with a non-toxic resinous chlorinated paraffin containing at least about 65% chlorine and antimony oxide, said expandable polystyrene, chlorinated paraffin and antimony oxide being utilized in proportions of approximately 70 to 87.5, 10 to 30 and 2.5 to 20 parts by weight respectively.

9. In a process for producing a flame-retardant integral cellular polymeric structure characterized by small voids and a density of approximately 2–3 lbs. per cubic foot, the steps comprising melting approximately 10 to 30 parts by weight of a non-toxic resinous chlorinated paraffin containing at least about 65% chlorine having a specific gravity in the range 1.6 to 1.7 and melting point in the range of 90 to 100° C., homogeneously dry mixing therewith from 2.5 to 20 parts by weight of finely divided antimony oxide, thoroughly covering by dry mixing the surface of polystyrene beads having integrated therewith from 5 to 30 parts of petroleum ether boiling in the range of 35 to 60° C. per 100 parts of polymer, said polystyrene being utilized in a quantity of 70 to 87.5 parts by weight with the homogeneous mixture of said chlorinated paraffin and said antimony oxide, partially filling a vented mold with the covered polystyrene beads and thereafter heating said particles to effect expansion and colescence.

References Cited in the file of this patent

UNITED STATES PATENTS

| | | |
|---|---|---|
| 2,442,940 | Staudinger | June 8, 1948 |
| 2,480,298 | Happoldt | Aug. 30, 1949 |
| 2,664,411 | Cooper | Dec. 29, 1953 |
| 2,669,521 | Bierly | Feb. 16, 1954 |
| 2,681,321 | Stastny et al. | June 15, 1954 |
| 2,744,291 | Stastny et al. | May 8, 1956 |